(12) United States Patent
Robert et al.

(10) Patent No.: US 8,571,994 B2
(45) Date of Patent: Oct. 29, 2013

(54) METHOD AND SYSTEM FOR ALLOCATING ACCESS TO DIGITAL MEDIA CONTENT

(75) Inventors: Arnaud Robert, Simi Valley, CA (US); Robert Schonfeld, Sherman Oaks, CA (US); Maja Todorovic, Irvine, CA (US); David Diner, Glen Rock, NJ (US); Shih-Ta (Thomas) Peng, San Marino, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 13/469,004

(22) Filed: May 10, 2012

(65) Prior Publication Data
US 2012/0291140 A1 Nov. 15, 2012

Related U.S. Application Data

(63) Continuation-in-part of application No. 12/459,163, filed on Jun. 26, 2009.

(51) Int. Cl.
*G06F 21/00* (2013.01)
(52) U.S. Cl.
USPC .......... 705/59; 705/51; 705/57; 726/26; 726/27; 726/28; 726/29; 726/30; 726/31; 726/32; 726/33
(58) Field of Classification Search
USPC .............. 705/51, 57, 59; 726/26–33
See application file for complete search history.

(56) References Cited

U.S. PATENT DOCUMENTS

| | | | | |
|---|---|---|---|---|
| 7,415,439 B2 * | 8/2008 | Kontio et al. | | 705/53 |
| 7,546,641 B2 * | 6/2009 | Robert et al. | | 726/30 |
| 7,822,876 B1 * | 10/2010 | Kramer et al. | | 709/248 |
| 8,234,302 B1 * | 7/2012 | Goodwin et al. | | 707/783 |
| 8,239,512 B2 * | 8/2012 | Karaoguz et al. | | 709/223 |
| 8,316,237 B1 * | 11/2012 | Felsher et al. | | 713/171 |
| 8,364,595 B1 | 1/2013 | Ringewald | | |
| 2002/0184156 A1 | 12/2002 | Tadayon | | |
| 2003/0125976 A1 * | 7/2003 | Nguyen et al. | | 705/1 |
| 2004/0117663 A1 * | 6/2004 | Colvin | | 713/202 |

(Continued)

FOREIGN PATENT DOCUMENTS

WO  WO 2005/060199  6/2005

OTHER PUBLICATIONS

Merriam-Webster's Collegiate Dictionary, 10th Edition, Merriam-Webster, Inc., 1993, all pages.*

(Continued)

*Primary Examiner* — Calvin Cheung
(74) *Attorney, Agent, or Firm* — Farjami & Farjami LLP

(57) ABSTRACT

There is provided a method and system for allocating an entitlement to digital media content. In one implementation, the system includes a media server accessible over a communications network and configured to utilize a processor to issue the entitlement including a transferable authorization to access the digital media content to a first user, and to store an entitlement record identified with the first user and authorizing access to the digital media content by the first user in a memory of the media server. The media server is further configured to receive a communication including a data corresponding to the transferable authorization to access the digital media content from a second user and to update the entitlement record to authorize access to the digital media content by the second user.

26 Claims, 5 Drawing Sheets

(56) References Cited

U.S. PATENT DOCUMENTS

| | | | |
|---|---|---|---|
| 2004/0117853 A1* | 6/2004 | Karaoguz et al. | 725/134 |
| 2004/0267590 A1* | 12/2004 | Clark et al. | 705/9 |
| 2005/0004875 A1* | 1/2005 | Kontio et al. | 705/52 |
| 2005/0265555 A1* | 12/2005 | Pippuri | 380/284 |
| 2006/0106726 A1* | 5/2006 | Raley et al. | 705/59 |
| 2006/0174103 A1* | 8/2006 | Verma et al. | 713/151 |
| 2006/0259433 A1* | 11/2006 | Lahtinen et al. | 705/57 |
| 2007/0061886 A1* | 3/2007 | Le | 726/26 |
| 2007/0079381 A1* | 4/2007 | Hartung et al. | 726/26 |
| 2007/0179897 A1* | 8/2007 | Andersson | 705/59 |
| 2007/0226368 A1* | 9/2007 | Strickland | 709/243 |
| 2008/0010372 A1* | 1/2008 | Khedouri et al. | 709/224 |
| 2008/0022003 A1* | 1/2008 | Alve | 709/229 |
| 2008/0052165 A1* | 2/2008 | Jung et al. | 705/14 |
| 2008/0103977 A1* | 5/2008 | Khosravy et al. | 705/59 |
| 2008/0114836 A1* | 5/2008 | Zellner | 709/206 |
| 2008/0114992 A1* | 5/2008 | Robert et al. | 713/193 |
| 2008/0148363 A1* | 6/2008 | Gilder et al. | 726/4 |
| 2008/0162354 A1* | 7/2008 | Alve et al. | 705/51 |
| 2008/0285757 A1* | 11/2008 | Bradley et al. | 380/278 |
| 2009/0089884 A1* | 4/2009 | Watson et al. | 726/28 |
| 2009/0202079 A1* | 8/2009 | Puputti et al. | 380/279 |
| 2010/0250704 A1* | 9/2010 | Kittel | 709/219 |

OTHER PUBLICATIONS

Weiguo et al: "A Metadata-based Interoperable Digital Rights Management System Architecture", Computational Science and Optimization (CSO), 2010 Third International Joint Conference, May 28, 2010, pp. 432-434.

* cited by examiner

METHOD AND SYSTEM FOR ALLOCATING ACCESS TO DIGITAL MEDIA CONTENT

RELATED APPLICATIONS

This application is a Continuation-In-Part of U.S. patent application Ser. No. 12/459,163, filed on Jun. 26, 2009, titled "Method and System for Providing Digital Media Rental," which is hereby incorporated by reference in its entirety.

BACKGROUND

One of the many pleasures associated with the discovery of creative content that stimulates or moves us, is the sharing of that content with friends, family, or peers. Consider music content, for example. Historically, music content was recorded or stored on a physical medium, which served as a tangible proxy for the music it carried. Over time, the physical manifestation of that tangible proxy evolved, for example, from vinyl records, to magnetic tape cartridges, to optical compact discs (CDs), but the relationship of the music content to the medium storing the music was essentially inseparable. In that environment, in order to share content with others, we either had to share the experience in common, i.e., listen to the music together, or we had to temporarily transfer possession of the medium storing the content, e.g., I lend a CD to my friend and concurrently relinquish possession of the CD for the period of the loan.

Today, however, much of the creative content we consume is likely to be in the form of digital media files, which are readily reproduced, in whole or in part, and redistributed using our personal computers (PCs) or other increasingly ubiquitous personal communication devices. Consequently, while advances in technology have made it easier than ever before to make content available for others to enjoy, those advances no longer require that we share the content in the traditional sense described above, because we are no longer required to relinquish the ability to access an item of content in order to make that content available to another. As a result, the natural and constructive social impulse to share what we find pleasurable with others may lead to the unwitting redistribution of creative content in a manner that undermines the legitimate proprietary rights and valid commercial interests of the creators of the very content we most enjoy.

SUMMARY

There are provided methods and systems for allocating access to digital media content, substantially as shown in and/or described in connection with at least one of the figures, and as set forth more completely in the claims.

DETAILED DESCRIPTION

Figure 1:
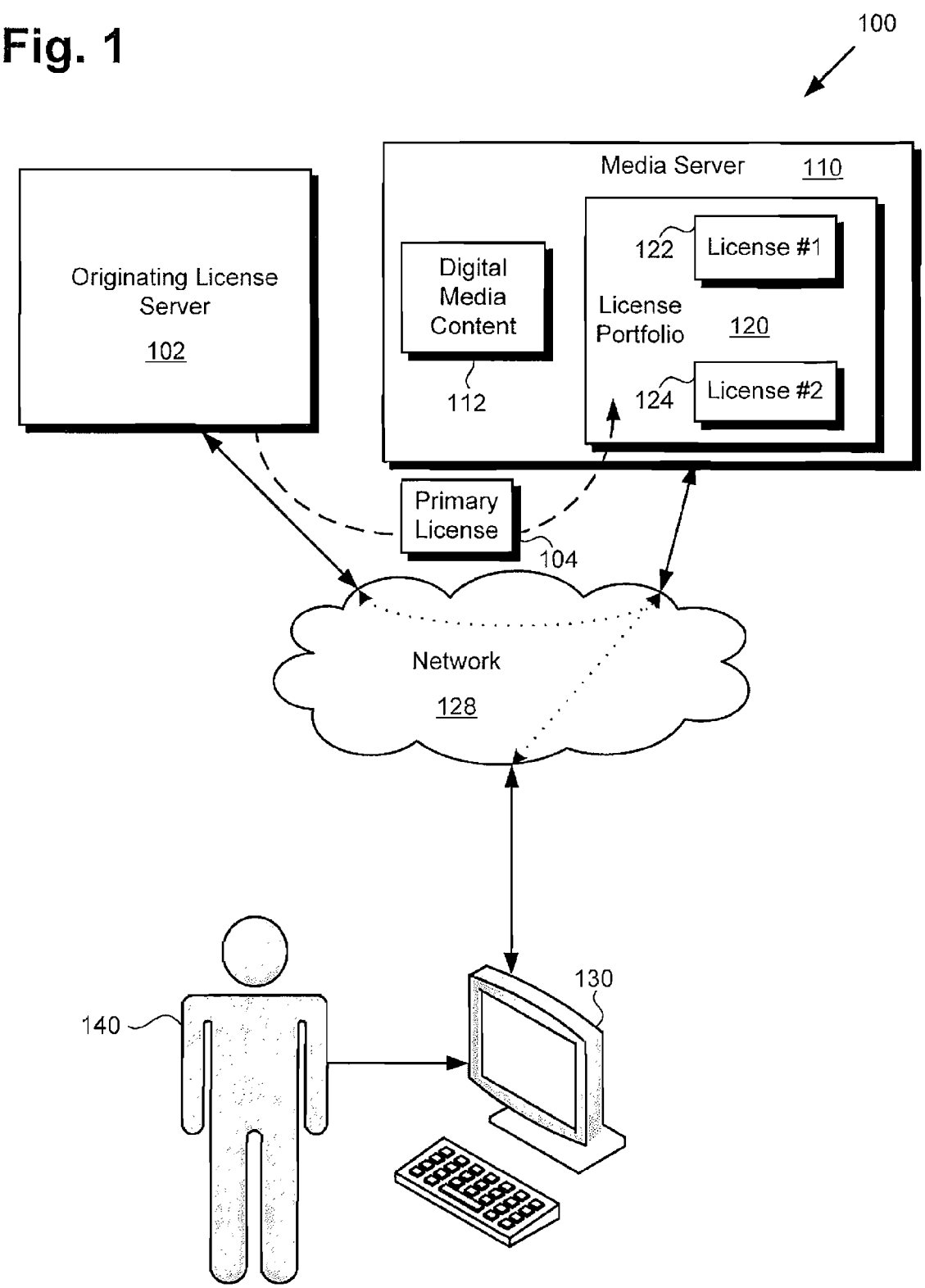
FIG. 1 shows a diagram of an example system for allocating access to digital media content, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Due in part to the ease with which digital media content can be reproduced and distributed using widely available computing and network systems, an effective solution for enabling authorized secondary distribution of digital media content while avoiding its unauthorized overuse includes at least temporary exchange of licensing rights to the content. For example, a genuine purchaser of licensed digital media content typically enjoys the right to use the licensed product to exhaustion. As an alternative to personally using the content, the genuine purchaser may transfer the right to use of the licensed product in a secondary transaction in which a packaged product embodying the media, such as a digital video disc (DVD) or Blu-ray™ disc, for example, typically changes possession.

However, because digital media content can be copied and stored in a memory of a personal computer (PC), for example, mere exchange of a packaged product is no assurance that the party purportedly transferring genuine ownership of the digital media content is in fact relinquishing access to that content. In addition, and again because digital media content can be copied and stored on a PC, the genuine owner may engage in unauthorized secondary distribution of the content by, for example, burning it to one or more units of optical media and distributing those units to other users, either in exchange for payment, or otherwise.

According to various implementations of the present inventive concepts, a genuine purchaser of digital media content is provided a mechanism for sharing the digital media content with others in an authorized way. In some implementations, for example, a genuine purchaser of a digital media file of a feature film may sell, rent, or loan the file to a secondary user by assigning them a license to view the file contents in a secondary transaction. As a result, the assignee of the license would acquire the rights of authorized access to the digital media content, and the assignor, e.g., the original genuine purchaser, might relinquish or have their access rights limited, during the assignment period, which may be permanent or temporary. In other words, authorized access to the digital media content may be allocated according to the assignment status of the license for the digital media content.

In one implementation the original genuine purchaser and the secondary user may be able to concurrently access the digital media content, while in another implementation, access by the original genuine purchaser may be blocked entirely during the assignment period. In still other implementations, access to the digital media content by the original genuine purchaser may simply be limited during the assignment period. For example, limited access to the digital media content may correspond to limiting access to the digital media by user device type, such as by allowing PC access but not mobile device access, or vice versa. Other examples of ways in which access by the original genuine purchaser may be limited during the assignment period include limiting access to the digital media content by transmission mode, e.g., streaming versus download, limiting access by media format, e.g., standard definition (SD) versus high definition (HD) format, and limiting access by duration in time. As a result, a genuine purchaser of the digital media content may enjoy the privileges of authorized ownership of a commercial product, such as sharing of the product in its traditional sense, while the creators and to producers of the content receive protection from its overuse or unauthorized redistribution.

FIG. 1 shows a diagram of one implementation of a system for allocating access to digital media content. In the implementation of FIG. 1, system 100 includes media server 110 on which are stored digital media content 112, and license portfolio 120 including digital media content licenses 122 and 124. Also shown in FIG. 1 are originating license server 102, primary license 104 being transferred from originating license server 102 to media server 110, network 128, client system 130, and user 140.

According to the implementation of FIG. 1, user 140 may utilize client system 130 and network 128 to communicate with media server 110 in order to request access to digital media content 112. Media server 110 can be configured to comply with the request by encrypting digital media content 112 to produce a secondary license, such as one of digital media content licenses 122 or 124, for all or a portion of digital media content 112 to user 140, and providing user 140 a temporary license key enabling access to the assigned portion of digital media content 112. In effect, media server 110 can be configured to allocate access to digital media content 112 by partitioning the assignment of license rights in time or through usage. As a result, media server 110 may be utilized to sell, rent, or lend access rights for digital media content 112 to a user, such as user 140, while permitting, limiting, or prohibiting concurrent access to digital media 112 by another user.

In one implementation, for example, system 100 may correspond to a home based business providing movie rentals of feature film content stored as digital media files. In that implementation, media server 110 may take the form of a PC, or other home computer platform, for example, rather than a dedicated network media server as shown in FIG. 1. More generally, as the computing power of portable communications devices continues to increase, it is contemplated that in some implementations media server 110 may be a portable device such as a mobile telephone, a digital media player, a personal digital assistant (PDA), a portable computer, or a gaming console, for example. According to any of those implementations, media server 110 may receive multiple requests for access to digital media content 112. A first request from a first user may be accommodated by encryption of digital media content 112 to produce secondary license 122 for assignment to the first user, for example, while a subsequent request from a second user may be similarly accommodated by assignment of secondary license 124 to the second user.

Each of secondary licenses 122 and 124 may be associated with a usage interval during which temporary license keys for making use of secondary licenses 122 and 124 are provided to the respective first and second users and enable access to digital media content 112. However, in some implementations it may be difficult or even undesirable to anticipate the volume of overlapping requests for access to digital media content 112. As a result, media server 110 may receive a request for access to digital media content 112 at a time when no secondary license is available in license portfolio 120 for assignment to another user. In those implementations, media server 110 may be configured to obtain a primary license for digital media content 112 from originating license server 102. For example, as shown in FIG. 1, media server 110 can request primary license 104 from originating license server 102 and obtain the additional license, via network 128.

Figure 2:
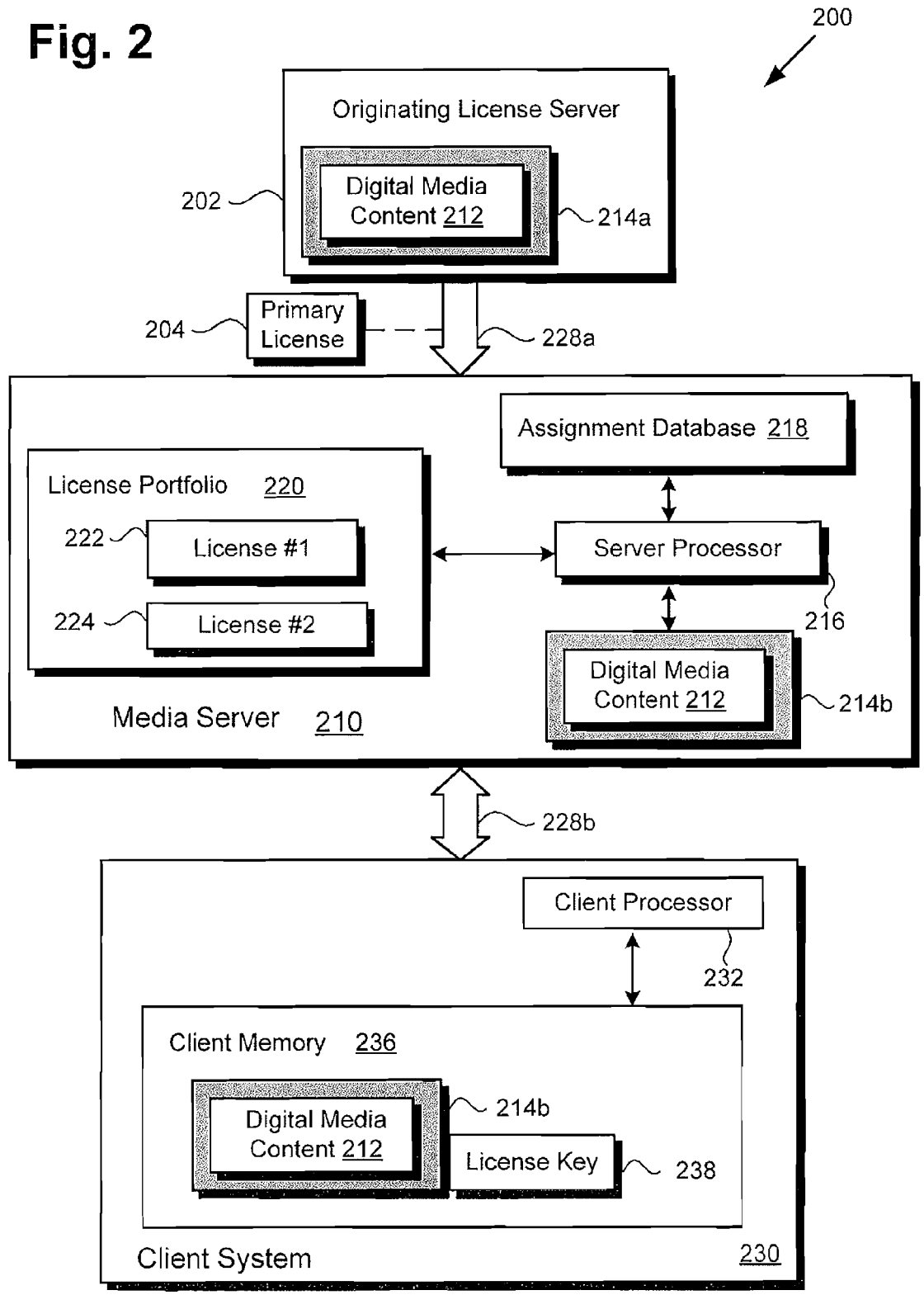
FIG. 2 shows a more detailed example of a system for allocating access to digital media content, corresponding to the implementation shown in FIG. 1.

Turning now to FIG. 2, FIG. 2 provides a more detailed implementation of a system for allocating access to digital media content corresponding to system 100, in FIG. 1. System 200, in FIG. 2, includes client system 230 receiving a data transfer via network communication link 228b from media server 210, which in turn receives primary license 204 for digital media content 212 protected by digital rights management wrapper (DRM) 214a from originating license server 202 over communication link 228a. As may be seen from FIG. 2, media server 210 includes digital media content 212 protected by secondary DRM 214b, server processor 216, assignment database 218, and license portfolio 220. Also included in FIG. 2 is client system 230 corresponding to client system 130, in FIG. 1. As further shown in FIG. 2, client system 230 includes client processor 232, and client memory 236.

Originating license server 202, media server 210, digital media content 212, primary license 204, and license portfolio 220, in FIG. 2, correspond respectively to originating license server 102, media server 110, digital media content 112, primary license 104, and license portfolio 120, in FIG. 1. As shown in FIG. 2, license portfolio 220 includes digital media content licenses 222 and 224, corresponding to digital media content licenses 122 and 124, in FIG. 1. DRM 214a, secondary DRM 214b, temporary license key 238, and assignment database 218 are not expressly represented in FIG. 1.

According to the present implementation, digital media content 212 wrapped by secondary DRM 214b, and temporary license key 238 are located in client memory 236, having been received from media server 210 via network communication link 228. In another implementation, however, one or both of media content 212 wrapped by secondary DRM 214b, and temporary license key 238 may not exist as local assets of client system 230. In that implementation, for example, secondary DRM 214b may wrap digital media content 212 on media server 210. In addition, in that implementation, temporary license key 238 may be associated with client system 230, but reside on media server 210.

Returning to the example implementation shown in FIG. 2 in which digital media content 212 wrapped by secondary DRM 214b, and temporary license key 238 are imported to be local assets of client system 230, network communication link 228b may represent download of those local assets over network 128 in FIG. 1, which may be a packet network such as the Internet, for example. Once transferred, digital media content 212 wrapped by secondary DRM 214b, and temporary license key 238 may be stored in client memory 236 and accessed locally on client system 230. It is noted that network communication link 228b is shown as a two-way communication, and may additionally represent periods of persistent connectivity between media server 210 and client system 230 over network 128. Moreover, client processor 232 may be the central processing unit for client system 230, for example, in which role client processor 232 runs the client operating system and facilitates access to and playback of digital media content 212.

Although the present discussion has thus far described digital media content 212, secondary DRM 214b, and temporary license key 238 as residing in client memory 236, or, alternatively, on media server 210, those characterizations are merely representative. For example, in some implementations, temporary license key 238 and/or digital media content 212, and secondary DRM 214b may be stored on a computer-readable medium, for use by a processor.

The expression "computer-readable medium," as used in the present application, refers to any medium that provides instructions to a processor, such as client processor 232, in FIG. 2. Thus, a computer-readable medium may correspond to various types of media, such as volatile media, non-volatile media, and transmission media, for example. Volatile media may include dynamic memory, such as dynamic random access memory (dynamic RAM), while non-volatile memory may include optical, magnetic, or electrostatic storage devices. Transmission media may include coaxial cable, copper wire, or fiber optics, for example, or may take the form of acoustic or electromagnetic waves, such as those generated through radio frequency (RF) and infrared (IR) communications. Common forms of computer-readable media include, for example, a compact disc read-only memory (CD-ROM), DVD, Blu-ray, or other optical disc; a RAM, programmable read-only memory (PROM), erasable PROM (EPROM), FLASH memory, or a transmission carrier wave.

The systems embodied by FIG. 1 and FIG. 2 will now be further described by reference to FIG. 3, which presents flowchart 300 describing an example method for use by a media server for allocating access to digital media content. With respect to the method outlined in FIG. 3, it is noted that certain details and features have been left out of flowchart 300 in order not to obscure the discussion of the inventive features in the present application.

Figure 3:
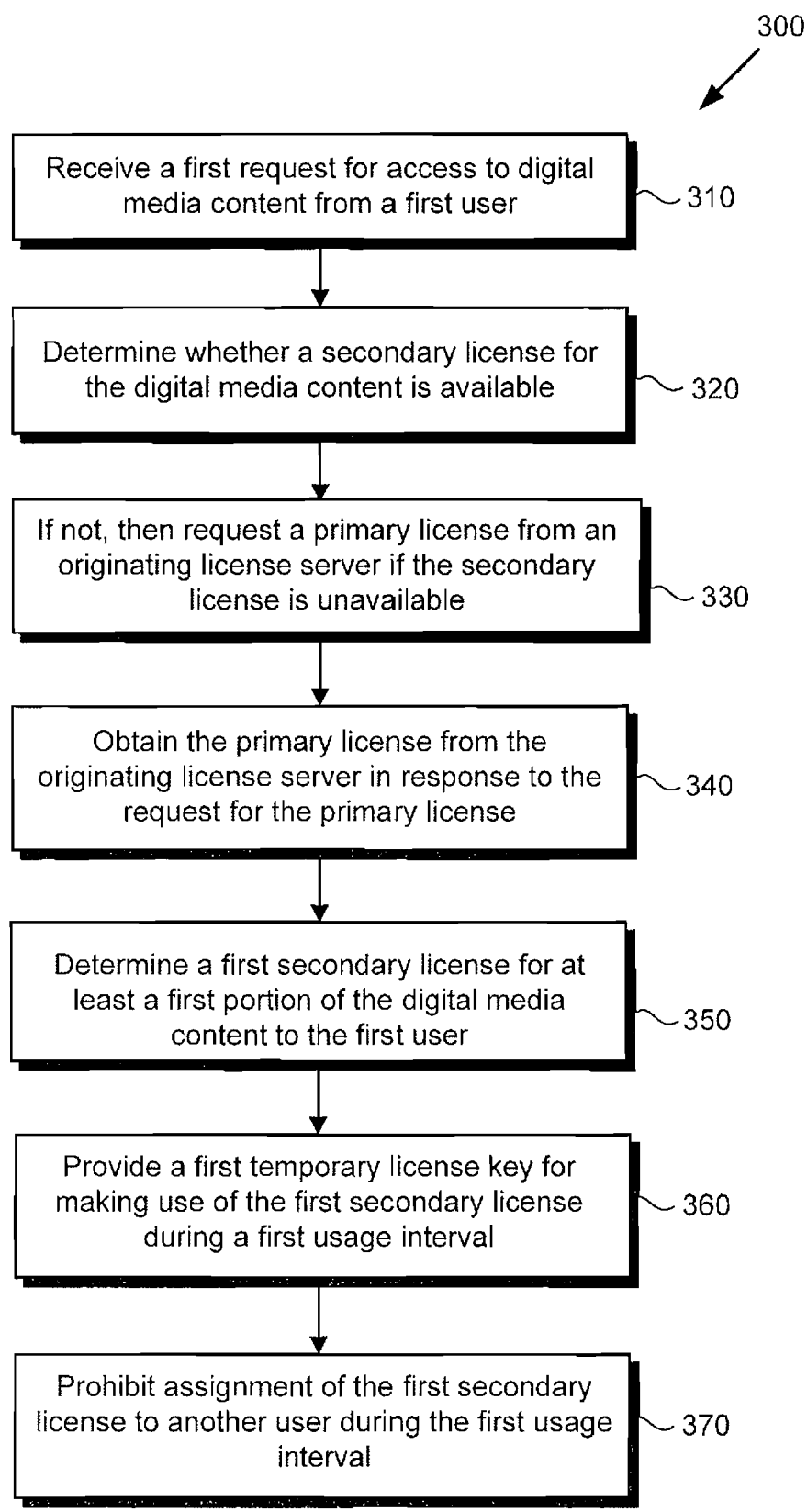
FIG. 3 is a flowchart presenting a method for allocating access to digital media content, according to one implementation.

Referring to FIG. 3 in combination with FIG. 1, flowchart 300 begins with receiving a first request for access to digital media content 112 from first user 140 (310). This may correspond to receipt by media server 110 of data corresponding to such a request from client system 130, via network 128. Digital media content 112 may include an entire digital media file, which may be a streamable media file, for example. Digital media content 112 may include audio-visual content, such as a feature film, for example, in HD or SD video formats. Alternatively, digital media content 112 may include music content, gaining content, or any of a variety of entertainment or instructional content, for example.

Flowchart 300 continues by determining whether a secondary license is available for use by first user 140 to access digital media content 112 (320). The determination may be performed by media server 110, and can correspond to determining whether license portfolio 120 contains an available license for digital media content 112, such as one of licenses 122 or 124. As explained previously by reference to FIG. 1, in some implementations, a secondary license for digital media content 112 may not be available, for example, because all existing secondary licenses are presently assigned to other users. In those implementations, the method of flowchart 300 may proceed by media server 110 requesting primary license 104 for digital media content 112 from originating license server 102 (330), and obtaining primary license 104 from licensor server 102 in response to the request (340).

Flowchart 300 continues by determining a first secondary license, based on primary license 104 and the first request, for at least a first portion of digital media content 112 to first user 140 (350). Determination of a secondary license may be performed by media server 110. Referring to FIG. 2, determination of a secondary license may be accompanied by storage in assignment database 218 of data corresponding to the present assignment status of the license. For instance, assignment of secondary license 222 to the first user may be accompanied by creation in assignment database 218 of a record of the present assignment of secondary license 222 to the first user. Thus, entries in assignment database 218 may be used by media server 210 when performing iterations of determining (320) for subsequently received user requests for access to digital media content 212. Moreover, in implementations in which media server 210 is in possession of a number of secondary licenses for digital media content 212 in license portfolio 220, determination of a first secondary license (350) may be followed by decrementing the number of secondary licenses for digital media content 212 by one.

Although in some implementations, a secondary license for the entirety of digital media content 212 may be determined, in other implementations, a secondary license for only one or more portions of digital media content may be assigned at a time, such as at least a first portion of digital media content 212. For example, consider the scenario, invoked previously, in which media server 210 is used to support a home based movie rental business. In that case, digital media content 212 may include a media file containing a particular movie. However, it may be strategically advantageous for the operator of media server 210 to maximize the number of secondary users, i.e., renters, to whom access to digital media content 212 can be assigned during a particular time interval. Where, for instance, assignment of a portion of digital media content 212 is temporary and based on usage, such as a single viewing of the relevant content, licensing of the entirety of digital media content 212 would require a waiting period for reuse of digital media content 212 lasting at least as long as the playback time of the entire movie. By licensing only a first portion of the movie, however, such as the first scene, a predetermined number of frames, or a predetermined playback time, for example, media server 210 might be able to recycle content, i.e., make the same unit of digital media content re-available for licensing, more rapidly. In that way, media server 210 might be able to accommodate a large number of requests for access to digital media content 212, such as one hundred requests, for example, with less than one hundred full licenses for digital media content 212, thereby reducing operating overhead while avoiding unlicensed overuse of digital media content 212.

In one implementation, determining a secondary license for some or all of digital media content 212 may correspond to encrypting digital media content 212 by media server 210 to produce a secondary license, such as a rental license, for the digital media content. As shown in FIG. 2, in some implementations, generation of a secondary license may correspond to wrapping digital media content 212 in a secondary DRM 214b produced by encryption of digital media content 212 by media server 210, before making the content available to the user.

Flowchart 300 continues by providing first temporary license key 238 for making use of the first secondary license during a first usage interval (360), first temporary license key 237 providing access to the portion of digital media content 212 to which a secondary license was previously determined (350). First temporary license key 238 may be issued by media server 210, and may be designed to provide access to some or all of digital media content 212 for the duration of a first usage interval. The first usage interval, which may be permanent in the case of resale of digital media content 212, may define a temporary interval corresponding to a rental or lending transaction during which the user to whom a secondary license for some or all of digital media content 212 has been assigned may access that content. In some implementations, the first usage interval may correspond to a predetermined period of time, such as twenty-four hours, for example.

In other implementations, the first usage interval may correspond to one or more usage rules for the digital media content, and may correspond to a predetermined number of times the user utilizes the digital media content, such as a single use, for example.

In addition to providing first temporary license key 238, in some implementations, providing access to digital media content 212 may include copying digital media content 212 received from originating license server 202, and sending the copied digital media content to the user, e.g., as digital media content 212 residing in client memory 236. In other implementations, providing access to digital media content 212 may include streaming the digital media content to client system 230 over network communication link 228b.

Although in some implementations, the first usage interval may start to run concurrently with provision of first temporary license key 238, in other implementations, a method for allocating access to digital media content 212 may include initiating the first usage interval subsequent to provision of first temporary license key 238. For example, in one implementation the first usage interval may correspond to a persistent connectivity interval of client system 130 and media server 110 over network 128. In that implementation, initiation of the usage interval may be performed by media server 210 in response to receipt of data from client system 230 confirming client system connectivity. The first temporary license key would then enable client system 230 to access digital media content 212 as long as network connectivity of client system 230 and media server 210 is not intentionally interrupted by client system 230, at which time the first usage interval could be expired by media server 210.

According to the exemplary implementation shown in FIG. 3, flowchart 300 concludes by prohibiting assignment of the first secondary license determined to the first user, to another user during the first usage interval (370). The prohibition may be imposed by media server 210, and corresponds to reserving the licensed content for the exclusive use of the first user assignee on a temporary basis. Such a prohibition can be effectuated algorithmically, using server processor 216, and by reference to one or both of assignment database 218 and license portfolio 220. As previously mentioned, assignment database 218 is configured to store the assignment status of licenses held on media server 210. In addition, in implementations in which the number of licenses available in license portfolio 220 is decremented by one according to each assignment, absence of an available license in license portfolio 220 avoids concurrent assignment of a single license, e.g., unlicensed overuse of the digital media content.

Thus, the described prohibition is consistent with repetition of flowchart 300 for a second user request for access to digital media content 212a. In that event, finding that an existing first secondary license has been assigned to the first user and that the first usage interval is still in effect, media server 210 can be configured to determine availability of a second secondary license, obtain a second primary license from originating license server 102 if a secondary license is not present in license portfolio 220, determine the second secondary license for at least a portion of the digital media content to the second user, provide a second temporary license key for making use of the second secondary license and providing access to the digital media content during a second usage interval, and prohibit assignment of the second secondary license to another user during the second usage interval.

In other implementations, however, more than one user may be able to access the same licensed digital media content concurrently. In still other implementations, access to the digital media content by one user may simply be limited during an assignment period to another user. For example, as described above, limited access to the digital media content may correspond to limiting access to the digital media by user device type, such as by allowing PC access but not mobile device access. Other examples of ways in which access to the digital media content may be limited include limiting access to the digital media content by transmission mode, e.g., streaming versus download, limiting access by media format, e.g., SD versus HD format, and limiting access by duration in time.

Although not expressly enumerated in flowchart 300 of FIG. 3, a method for allocating access to digital media content may further include expiring the first usage interval of the first secondary license and updating assignment database 218 to reflect that change. As a result, the present method enables subsequent reassignment of the first secondary license, after the first usage interval, for example, through incrementing the number of secondary licenses available in license portfolio 220 by one after lapse of the first usage interval of first temporary license key 238.

Figure 4:
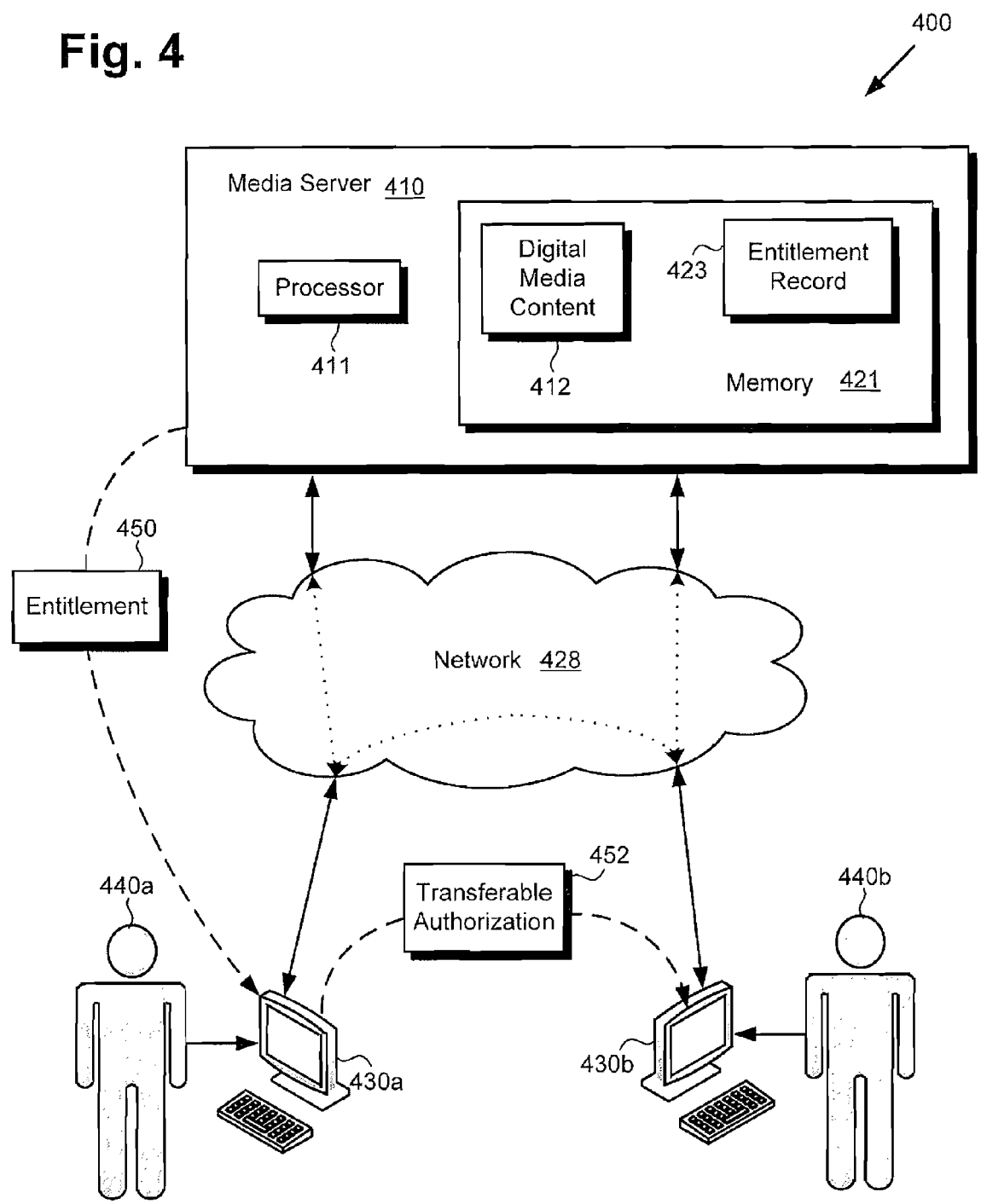
FIG. 4 shows a diagram of an example system for allocating access to digital media content, according to another implementation.

FIG. 4 shows a diagram of another implementation of an example system for allocating access to digital media content. In the implementation of FIG. 4, system 400 includes media server 410 including processor 411, and memory 421 which stores digital media content 412 and entitlement record 423. As further shown by FIG. 4, media server 410 is configured to issue entitlement 450 corresponding to digital media content 412 to first user 440a via network 428 and client system 430a, and is further capable of communicating with client systems 430a and 430b through network 428. The media server 410 may be referred to as "in the cloud" or in a cloud computing system.

In another implementation, entitlement 450 may be stored and managed "in the cloud," such as a flag that can be set or reset in memory 421 that allows a user to access a movie. An entitlement can relate to many licenses.

Also shown in FIG. 4 are second user 440b, and transferable authorization 452 being transferred from first user 440a to second user 440b via respective client systems 430a and 430b.

Media server 410, digital media content 412, network 428, client system 430a, and first user 440a correspond respectively to media server 110, digital media content 112, network 128, client system 130, and user 140, in FIG. 1, and may share some or all of the characteristics attributed to those corresponding features above. It is noted that certain features in FIG. 4 are not in FIG. 1, e.g., entitlement 450, entitlement record 423, and transferable authorization 452. Also, some features in FIG. 1 are not in FIG. 4, e.g., originating license server 102, primary license 104, and license portfolio 120. However, those system variations are intended to enhance conceptual clarity in order to emphasize licensing of digital media content 112 in FIG. 1 through FIG. 3 and entitlement management in FIG. 4 and subsequent FIG. 5, and should not be interpreted as limitations.

It is noted that, as used herein, an entitlement, such as entitlement 450, includes one or more rights for accessing or allocating access to a unit of digital media content, such as digital media content 412. Such an entitlement 450 may enable a first user 440a of the digital media content 412 to obtain a primary license for digital media content 412, as discussed in relation to FIG. 1 through FIG. 3 above. Entitlement 450 may include transferable authorization 452, enabling first user 440a of digital media content 412 to loan or rent access to digital media content 412, for example, to second user 440b, while concurrently relinquishing the right to access digital media content 412 during the loan or rental period.

Moreover, transfer of transferable authorization 452 to second user 440b can enable second user 440b to obtain a secondary license for digital media content 412, as described above by reference to FIG. 1 through FIG. 3, enabling use of digital media content 412 during the period of the rental or loan.

It is further noted that although FIG. 4 shows first user 440a and second user 440b, the present concepts are readily extended to additional users, such as a third user, a fourth user, and so forth, to whom transferable authorization 452 may be loaned or rented by first user 440a or second user 440b.

According to the implementation shown in FIG. 4, first user 440a may utilize client system 430a and network 428 to communicate with media server 410 in order to request access to digital media content 412. Media server 410 can be configured to comply with the request by issuing entitlement 450 (or a license or license key) including transferable authorization 452 to access digital media content 412, to first user 440a through network 428 and client system 430a. In addition, media server 410 can be configured to store entitlement record 423 identified with first user 440a and authorizing access to digital media content 412 by first user 440a in memory 421.

Moreover, and subsequent to transfer of transferable authorization 452 to access digital media content 412 from first user 440a to second user 440b, media server 410 can be configured to receive a communication including data corresponding to transferable authorization 452, such as an authorization code or pin, for example, from second user 440b, and to update entitlement record 423 to authorize access to digital media content 412 by second user 440b while concurrently permitting, limiting, or blocking access to digital media content 412 by first user 440a. That transfer or allocation of access rights to digital media content 412 from first user 440a to second user 440b may persist during an interval that may be time or usage based, and which may be predetermined or designated by first user 440a, for example.

In one implementation, for example, entitlement record 423 may include a library of entries corresponding respectively to entitlements owned by first user 440a. Moreover, in some implementations, entitlement record 423 may include information identifying the user presently in possession of transferable authorization 452 and/or a user history documenting prior transfers of transferable authorization 452. Thus, in some implementations, first user 440a may be able to invite second user 440b or other users to browse the digital media library holdings of first user 440a by accessing entitlement record 423 via network 428, as well as to request present access or to reserve future access to a unit of digital media content, such as digital media content 412.

Client systems 430a and 430b, although represented as PCs in FIG. 4, may more generally take the form of any suitable communication device such as a mobile telephone, a digital media player, a PDA, a portable computer, or a gaming console, for example.

System 400 can be configured in a variety of ways to enable loans or rentals, for example, of access to digital media content 412 between users. As mentioned above, in one implementation, second user 440b may browse a library of digital media content owned by first user 440a by accessing entitlement record 423.

In some implementations, system 400 may support the generation of wish lists by one or more users 440a and 440b, documenting digital media content to which access is desired by the respective user. Moreover, in some implementations entitlement record 423 may be configured to include such wish lists. For example, entitlement record 423 may include a wish list including digital media content to which first user 440a desires but presently lacks access, and/or wish lists of other users, such as second user 440b, including digital media content to which first user 440a holds an entitlement and to which the other users desire access.

System 400 will now be further described by reference to FIG. 5, which presents flowchart 500 describing an example method for use by a media server for allocating access to digital media content. With respect to the method outlined in FIG. 5, it is noted that certain details and features have been left out of flowchart 500 in order not to obscure the discussion of the inventive features in the present application.

Figure 5:
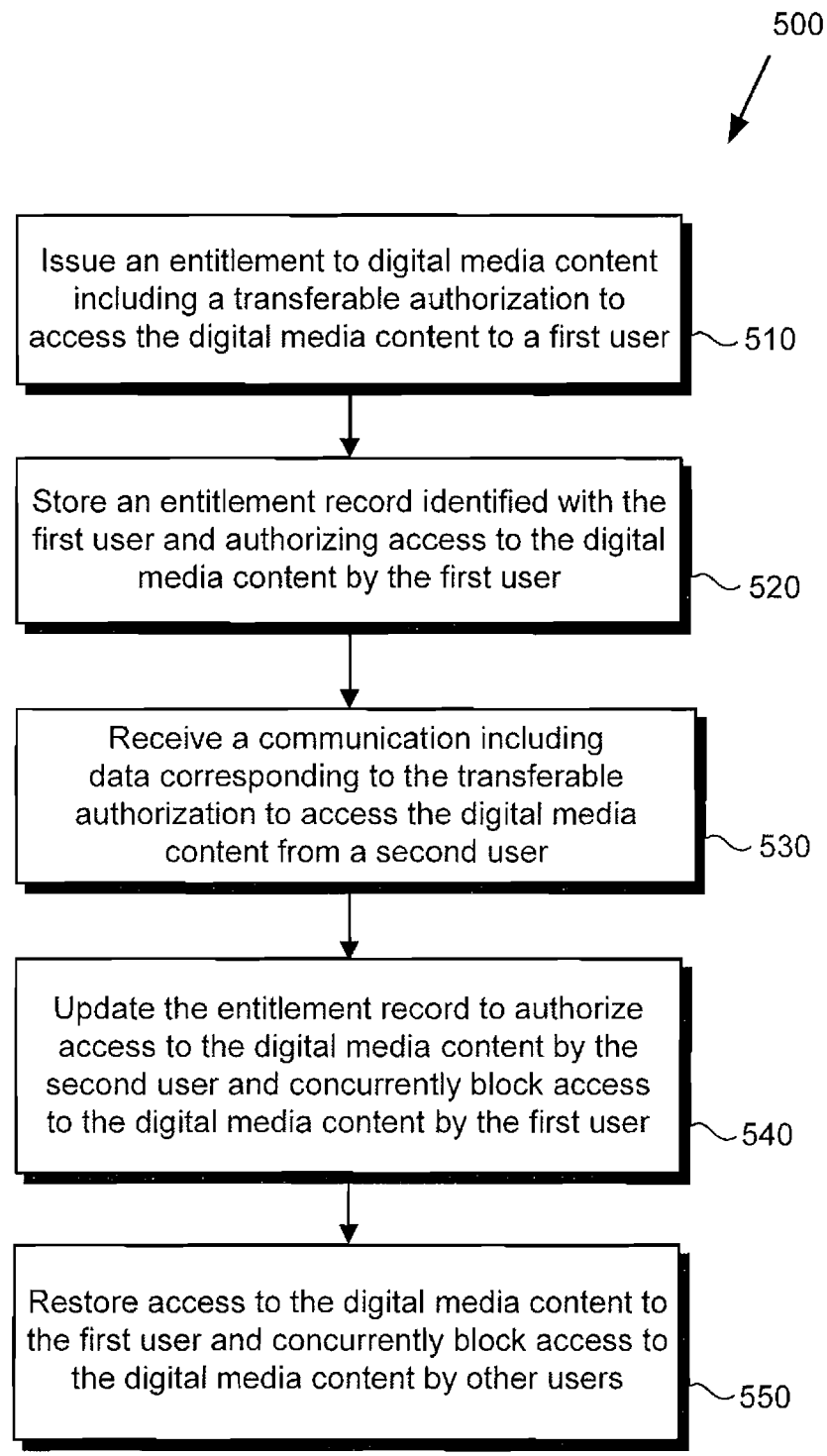
FIG. 5 is a flowchart presenting another example method for allocating access to digital media content, suitable for use by the example system shown in FIG. 4.

Referring to FIG. 5 in combination with FIG. 4, flowchart 500 begins by issuing entitlement 450 to digital media content 412, including transferable authorization 452 to access digital media content 412, to first user 440a (510). The issuance of entitlement 450 may be in response to receiving, by media server 410, a request for access to digital media content 412 from first user 440a, for example via network 428.

As noted above, digital media content 412 corresponds to digital media content 112 described in conjunction with FIG. 1, and may similarly include an entire digital media file, such as a streamable media file, for example. Moreover, like previously described digital media content 112, digital media content 412 may include audio-visual content, such as a feature film, for example, in HD or SD video formats. Alternatively, digital media content 412 may include music content, gaming content, or any of a variety of entertainment or instructional content, for example.

Flowchart 500 continues by storing entitlement record 423 identified with first user 440a and authorizing access to digital media content 412 by first user 440a, in memory 421 (520). As explained above, entitlement record 423 is identified with first user 440a and may include a library of entries corresponding respectively to entitlements owned by first user 440a. Moreover, in some implementations, entitlement record 423 may include information identifying the user presently in possession of transferable authorization 452 and/or a user history documenting prior transfers of transferable authorization 452.

Subsequent to loan, rental, or other transfer of transferable authorization 452 from first user 440a to another user, such as second user 440b, flowchart 500 continues by receiving a communication including data corresponding to transferable authorization 452 to access digital media content 412 from second user 440b (530). The data corresponding to transferable authorization 452 may include an authorization code, such as an alphanumeric code, for example, or a numerical pin, included with transferable authorization 452 provided to second user 440b. Such an authorization code or pin may be received by media server 410 in any suitable communication mediated by network 428, such as by Short Message Service (SMS) text message, or by email, for example.

Flowchart 500 then continues by updating entitlement record 423 to authorize access to digital media content 412 by second user 440b and concurrently block access to digital media content 412 by first user 440a (540). The described updating of entitlement record 423 enables the temporary loan or rental, for example, of access to digital media content 412 initiated by the transfer of transferable authorization 452 from first user 440a to second user 440b.

Flowchart 500 concludes by restoring access to digital media content 412 to first user 440a and concurrently blocking access to digital media content 412 by second user 440b or any other user having acquired transferable authorization 452 from second user 440b (550). Restoration of access to first user 440a and concurrent blocking of access by any other users may occur in response to one or more of several triggers. For example, in some implementations, transferal of transferable authorization 452 from first user 440a to second user 440b may be configured to expire after an interval of time or a usage interval. For instance, in one implementation, transferal of transferable authorization 452 from first user 440a to second user 440b may be configured to expire after a time interval such as hours, days, or weeks, that may be predetermined or affirmatively designated by first user 440a.

Although the exemplary implementation described by flowchart 500 describes blocking access to the digital media content so that only one user is authorized to access the digital media content at any given time, in one implementation, more than one user may be able to access the same licensed digital media content concurrently. In still other implementations, access to the digital media content by one user may simply be limited during an assignment period to another user. For example, and as discussed, limited access to the digital media content may correspond to limiting access to the digital media by user device type, such as by allowing mobile device access but not PC access. Other examples of ways in which access to the digital media content may be limited include limiting access to the digital media content by transmission mode, e.g., streaming versus download, limiting access by media format, e.g., SD versus HD format, and limiting access by duration in time.

It is noted that in some implementations, transferable authorization 452 may be transferred by second user 440b to a third user (not shown in FIG. 4) prior to restoration of access to digital media content 412 to first user 440a. In those implementations, media server 410 may be configured to receive another communication including data corresponding to transferable authorization 452 to access digital media content 412 from the third user, and to update entitlement record 423 to authorize access to digital media content 412 by the third user and concurrently block access to digital media content 412 by first user 440a and second user 440b during the remainder of the predetermined or first user designated time interval.

Moreover, and as mentioned above, in some implementations, transferal of transferable authorization 452 from first user 440a to second user 440b may be configured to expire after an interval determined by usage of digital media content 412 by second user 440b or a third or any other user obtaining transferable authorization 452 through second user 440b, such as a first complete use or more than one complete use of digital media content 412. In one implementation, transferal of transferable authorization 452 from first user 440a to second user 440b may be configured to expire after a predetermined usage or a usage designated by first user 440a. In such implementations, media server 410 may be configured to receive another communication including data corresponding to transferable authorization 452 to access digital media content 412 from a third user, as well as subsequent users, and to update entitlement record 423 to authorize access to digital media content 412 by the third or subsequent user and concurrently block access to digital media content 412 by first user 440a and second user 440b during the remainder of the predetermined or first user designated usage.

In yet other implementations, system 400 may enable first user 440a to unilaterally recover access to digital media content 412, i.e., to restore access to digital media content 412 to first user 440a, at substantially any time. Such a feature advantageously enables first user 440a to reclaim possession of transferable authorization 452 in the event of misconduct by second user 440b or a subsequent user, or failure of a transfer interval to expire properly, for example.

In addition, recordation in entitlement record 423 of a user history documenting prior transfers of transferable authorization 452, as well as the user presently in possession of transferable authorization 452 enables first user 440a to track transfers of transferable authorization 452 and to identify any user having access to digital media content 412. Furthermore, in some implementations, system 400 may be configured to enable first user 440a to prohibit one or more particular users from accessing digital media content 412 using transferable authorization 452. In those implementations, for example, entitlement record 423 may include a list of one or more prohibited users. Subsequent receipt of a communication including data corresponding to transferable authorization 452 from any prohibited user may result in refusal of the requested access and/or restoration of access to digital media content 412 to first user 440a and concurrent blocking of access to digital media content 412 by any other user, for example.

Thus, from the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A method for use by a media server including a processor and a memory for allocating an entitlement to a digital media content, the method comprising:
   issuing, by the media server, the entitlement including a transferable authorization to access the digital media content, to a first person using a first device for accessing the media server over a network;
   storing in the memory an entitlement record identified with the first person, the entitlement record authorizing access to the digital media content by the first person;
   receiving, by the media server from the first person, a communication including data corresponding to the transferable authorization issued to the first person, wherein the data authorizes access to the digital media content requested by a second person using a second device for accessing the media server over the network, wherein the data corresponding to the transferable authorization neither includes a license key nor the digital media content; and
   updating the entitlement record in the memory of the media server to authorize access to the digital media content requested by the second person.

2. The method of claim 1, wherein access to the digital media content by the second person is expired after a predetermined time interval.

3. The method of claim 2, further comprising:
   receiving, by the media server, another communication including another data corresponding to the transferable authorization issued to the first person, wherein the another data authorizes access to the digital media content by a third person using a third device for accessing the media server over the network, wherein the another data corresponding to the transferable authorization neither includes a license key nor the digital media content; and updating the entitlement record in the memory of the media server to authorize access to the digital media content by the third person.

4. The method of claim 1, wherein access to the digital media content by the second person is expired after a first person designated time interval.

5. The method of claim 4, further comprising:

receiving, by the media server, another communication including another data corresponding to the transferable authorization issued to the first person, wherein the another data authorizes access to the digital media content by a third person using a third device for accessing the media server over the network, wherein the another data corresponding to the transferable authorization neither includes a license key nor the digital media content; and updating the entitlement record in the memory of the media server to authorize access to the digital media content by the third person.

6. The method of claim 1, wherein access to the digital media content by the second person is expired after a predetermined usage of the digital media content.

7. The method of claim 6, wherein the predetermined usage of the digital media content comprises a first complete use of the digital media content.

8. The method of claim 1, wherein access to the digital media content by the second person is expired after a usage of the digital media content designated by the first person.

9. The method of claim 1, wherein the entitlement record identified with the first person enables the first user to identify any person having access to the digital media content.

10. The method of claim 1, wherein updating the entitlement record to authorize access to the digital media content by the second person concurrently blocks access to the digital media content by the first person.

11. The method of claim 10, wherein the entitlement record identified with the first person enables the first person to unilaterally restore access to the digital media content to the first person at substantially any time.

12. The method of claim 1, wherein updating the entitlement record to authorize access to the digital media content by the second person includes concurrently limiting access to the digital media content by the first person.

13. The method of claim 12, wherein limiting access to the digital media content by the first person comprises at least one of limiting access to the digital media by user device type, limiting access to the digital media by transmission mode, limiting access to the digital media content by media format, and limiting access to the digital media content by duration in time.

14. A system for allocating an entitlement to a digital media content, the system comprising:

a media server accessible over a communications network, the media server including a processor and a memory, the processor configured to:

issue the entitlement including a transferable authorization to access the digital media content to a first person using a first device for accessing the media server over the communication network;

store, in the memory, an entitlement record identified with the first person the entitlement record authorizing access to the digital media content by the first user;

receive a communication including a data corresponding to the transferable authorization issued to the first person, wherein the data authorizes access to the digital media content requested by a second person using a second device for accessing the media server over the communication network, wherein the data corresponding to the transferable authorization neither includes a license key nor the digital media content; and update the entitlement record in the memory to authorize access to the digital media content requested by the second person.

15. The system of claim 14, wherein the media server is further configured such that access to the digital media content by the second person is expired after a predetermined time interval.

16. The system of claim 15, wherein the media server is further configured to:

receive another communication including another data corresponding to the transferable authorization issued to the first person, wherein the another data authorizes access to the digital media content by a third person using a third device for accessing the media server over the communication network, wherein the another data corresponding to the transferable authorization neither includes a license key nor the digital media content; and update the entitlement record in the memory to authorize access to the digital media content by the third person.

17. The system of claim 14, wherein the media server is further configured such that access to the digital media content by the second person is expired after a first user designated time interval.

18. The system of claim 17, wherein the media server is further configured to:

receive another communication including another data corresponding to the transferable authorization issued to the first person, wherein the another data authorizes access to the digital media content by a third person using a third device for accessing the media server over the communication network, wherein the another data corresponding to the transferable authorization neither includes a license key nor the digital media content; and update the entitlement record in the memory to authorize access to the digital media content by the third person.

19. The system of claim 14, wherein the media server is further configured such that access to the digital media content by the second person is expired after a predetermined usage of the digital media content.

20. The system of claim 19, wherein the predetermined usage of the digital media content comprises a first complete use of the digital media content.

21. The system of claim 14, wherein the media server is further configured such that access to the digital media content by the second person is expired after a usage of the digital media content designated by the first person.

22. The system of claim 14, wherein the entitlement record identified with the first person enables the first person to identify any user having access to the digital media content.

23. The system of claim 14, wherein the media server is configured to update the entitlement record to authorize access to the digital media content by the second person and concurrently block access to the digital media content by the first person.

24. The system of claim 23, wherein the entitlement record identified with the first person enables the first person to unilaterally restore access to the digital media content to the first person at substantially any time.

25. The system of claim 14, wherein the media server is configured to update the entitlement record to authorize access to the digital media content by the second person and concurrently limit access to the digital media content by the first person.

26. The method of claim 25, wherein limiting access to the digital media content by the person comprises at least one of limiting access to the digital media by user device type, limiting access to the digital media by transmission mode, limiting access to the digital media content by media format, and limiting access to the digital media content by duration in time.

* * * * *